United States Patent [19]

Tsukamoto et al.

[11] Patent Number: 5,677,084
[45] Date of Patent: Oct. 14, 1997

[54] ELECTRODE AND SECONDARY BATTERY USING THE SAME

[75] Inventors: Jun Tsukamoto; Takeji Nakae; Tatsuhiko Suzuki; Mikio Nii; Masayuki Kidai, all of Shiga-ken, Japan

[73] Assignee: Toray Industries, Inc., Tokyo, Japan

[21] Appl. No.: 290,907

[22] PCT Filed: Dec. 24, 1993

[86] PCT No.: PCT/JP93/01880

§ 371 Date: Nov. 21, 1994

§ 102(e) Date: Nov. 21, 1994

[87] PCT Pub. No.: WO94/15373

PCT Pub. Date: Jul. 7, 1994

[30] Foreign Application Priority Data

Dec. 25, 1992 [JP] Japan .................. 4-345913
Feb. 2, 1993 [JP] Japan .................. 5-015256
Feb. 16, 1993 [JP] Japan .................. 5-026850

[51] Int. Cl.$^6$ .................................. H01M 4/36
[52] U.S. Cl. ............ 429/218; 423/447.1; 423/447.2
[58] Field of Search .................... 429/235, 232, 429/238, 237, 213, 218; 423/447.2, 447.1

[56] References Cited

U.S. PATENT DOCUMENTS

| | | |
|---|---|---|
| 3,853,610 | 12/1974 | Byrne et al. .................. 423/447.2 |
| 3,886,386 | 5/1975 | Hillig .................. 310/251 |
| 4,046,663 | 9/1977 | Fleet et al. .................. 204/280 |
| 4,064,330 | 12/1977 | Gaines, Jr. et al. .................. 429/237 |
| 4,510,216 | 4/1985 | Nogami et al. .................. 429/101 |
| 4,855,122 | 8/1989 | Kitamura et al. .................. 423/447.1 |
| 4,861,575 | 8/1989 | Levan .................. 423/447.2 |
| 4,865,931 | 9/1989 | McCullough et al. .................. 429/218 |
| 5,080,963 | 1/1992 | Totarchuk et al. .................. 428/225 |
| 5,093,216 | 3/1992 | Azuma et al. .................. 429/218 |
| 5,158,843 | 10/1992 | Batson et al. .................. 429/218 |
| 5,225,296 | 7/1993 | Ohsawa et al. .................. 429/218 |

*Primary Examiner*—Prince Willis, Jr.
*Assistant Examiner*—Carol Chaney
*Attorney, Agent, or Firm*—Morrison & Foerster LLP

[57] ABSTRACT

The invention relates to an electrode suitable for a chargeable/dischargeable secondary battery in which a carbonaceous material capable of doping and dedoping of lithium ions is used as a negative electrode active material, wherein carbon fibers are used as the carbonaceous material in a form of an uni-directionally arranged body or in combination of electrically conductive foil or fibers, and further relates to a secondary battery using the electrode. The invention enables to provide a secondary battery having high capacitance and high outputting property.

16 Claims, 2 Drawing Sheets

ELECTRODE AND SECONDARY BATTERY USING THE SAME

TECHNICAL FIELD

The present invention relates to an electrode using carbon fibers and a chargeable/dischargeable secondary battery using the same.

BACKGROUND ART

In recent years, small secondary batteries having high capacitance have been remarkably demanded with the spread of portable devices such as video cameras and notebook-type personal computers. Most of the secondary batteries currently used are nickel-cadmium batteries which use alkaline electrolytic solutions. Such secondary batteries, however, show low battery voltages of about 1.2 V, and therefore are difficult to be improved in energy density. Under these circumstances, it has been investigated the high energy-type secondary batteries using lithium metal, which is the basest metal, for negative electrode.

However, the secondary batteries in which lithium metal is used for negative electrode have disadvantages such that the lithium develops to dendrites by the (re)charging/discharging cycle, which may cause a short circuit and further cause the danger of ignition of the batteries. In addition, as lithium metal used in a secondary battery is very active, such a battery itself involves highly dangerous factors. Therefore, they are questionable in domestic applicability. In order to solve the problems relating to safety described above, lithium ion secondary batteries using various carbonaceous materials have been proposed recently, by which high energy inherent to the lithium electrode can be given. The secondary batteries of this type are devised by utilizing the phenomenon that, since the carbonaceous material doped with lithium ions at charging comes to have the same electric potential as metal lithium, the carbonaceous material doped with lithium ions can be used for negative electrode in place of metal lithium. In this type of secondary battery, when discharged, the lithium ions which have been doped to the carbonaceous material are dedoped from the negative electrode and go back to the carbonaceous material to which the lithium ions have been doped originally. Therefore, the use of carbonaceous material doped with lithium ions for negative electrode never causes the problem of dendrite production, and furthermore gives excellent safety since metal lithium is not present; therefore has now been investigated extensively.

As the secondary batteries utilizing the doping of lithium ions to carbonaceous material, those have been known, for example, disclosed in Japanese Patent Application Laid-open Nos. 90863/1987 and 122066/1987. The carbonaceous materials used in the references above are generally in a form of powder, and therefore is required to be incorporated with a polymer as a binder such as Teflon and poly (vinylidene fluoride) for molding into an electrode. That is, an electrode can be prepared in the manner that a powdery carbonaceous material is mixed with a binder and then adhered to a metal mesh, or applied on a metal foil as a slurry. On the contrary, as for carbon fibers, there has been no precedent in which carbon fibers are practically used for electrodes of secondary batteries industrially. Therefore, the form or structure of electrode to be preferably employed or the preparation technique of such electrode has been quite unknown. In particular, the most serious technical problems are how to shape carbon fibers into an electrode, how to take the electrical contact of the carbon fiber with a current collector, how to solve a problem of electrical short circuit between a positive electrode and a negative electrode caused by the penetration of fluffs of the carbon fibers through a separator, and so on.

However, when carbon fibers are used in a form of non-woven fabric or woven fabric, the electrode can be prepared without or, if any, a trace amount of a binder. In addition, it is recognized that the use of carbon fibers for electrode is excellent with respect to chemical stability against electrolytes, structural stability against volume expansion caused by doping, cyclicity of (re)charging and discharging, and so on. As the secondary batteries using such electrodes, those have been known, for example, disclosed in Japanese Patent Application Laid-open Nos. 54181/1985 and 103991/1987. The electrodes using carbon fibers as described above, however, have a defect that the electrical connection with a metal, i.e. a taking-out electrode, becomes difficult. In case of a carbon powder electrode, since the carbon powder is mixed with a binder and then adhered to a metal mesh or applied on a metal foil as a slurry as described above, the metal mesh or metal foil can be used as a collecting electrode for the connection with a terminal. On the contrary, in case of a carbon fiber electrode, it has been tried to insert the ends of the carbon fibers into a mesh-shaped or foil-shaped current collecting metal electrode to be fixed. However, the carbon fiber tend to become into pieces and to be broken easily, and consequently the use of the carbon fibers is still disadvantageous in workability in preparation of electrode, as well as mechanical strength and durability of the resulting electrode. Further, such problem also occurs that the fluffs, i.e. broken fibers, penetrate through a separator to cause the electrical contact between a positive electrode and a negative electrode, which resulting in an internal short circuit. Furthermore, such problem occurs that, since the carbon fibers are merely inserted into the current collecting metal electrode, the voltage to be applied to the carbon fibers differs from that applied to the current collecting metal electrode due to the contact resistance of the carbon fibers. This can be detected by the phenomenon that the voltage returns immediately to the initial state When the application of voltage is stepped, in other words, the increase in so-called overvoltage, and so on. Still further, such problem occurs that, when the surface area of the electrode is increased, the difference in potential at the points far from the current collecting metal electrode becomes large due to the resistance of the carbon fibers and, as the result, uniform doping and dedoping hardly occurs.

BRIEF DESCRIPTION OF DRAWINGS

In FIGS. 1 to 4, 1 stands for a carbon fiber, 2 for a electroconducting wire, 3 for the direction of the taking-out electrode, 4 for a carbon fiber sheet, and 5 for an electroconducting wire, respectively.

BEST MODE FOR CARRYING OUT OF THE INVENTION

In order to solve the problems described above, the present invention is constructed as the followings.

That is the first invention of the present application is to provide an electrode comprising an uni-directionally arranged body of carbon fibers and a secondary battery using the same. In the present invention, the form in which the carbon fibers are arranged in an uni-axial direction can give excellent packed density and handling property of the carbon fibers. In this case, it is preferable that the carbon fibers are placed uniformly. If there exist some uneven areas in the carbon fiber arrangement, uniform doping can sometimes not be given.

The electrode according to the second invention of the present application is characterized by comprising a carbon fiber sheet and a foil or wires having electrical conductivity.

The practical modes preferably employed in the present invention are illustrated concretely in the followings with reference to the drawings attached.

Figure 1:
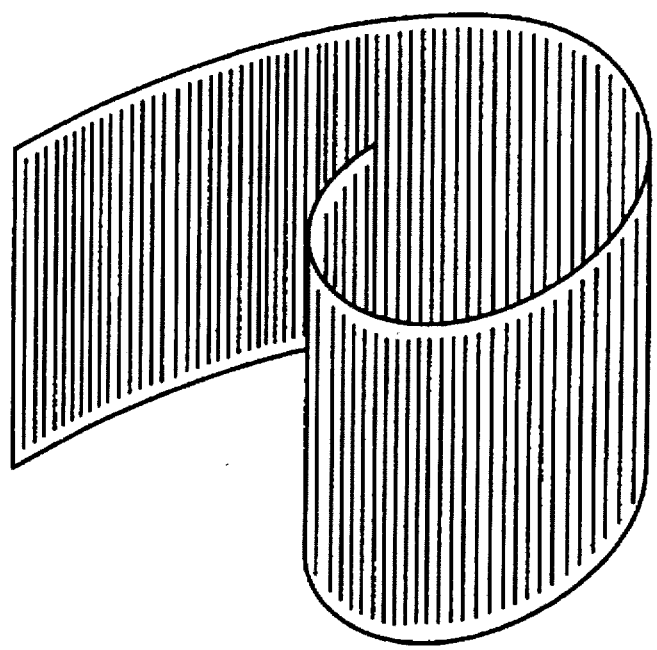
FIG. 1 is a schematic illustration of an embodiment of the electrode according to the present invention, in which an electroconducting foil is applied to a carbon fiber sheet.
Figure 2:
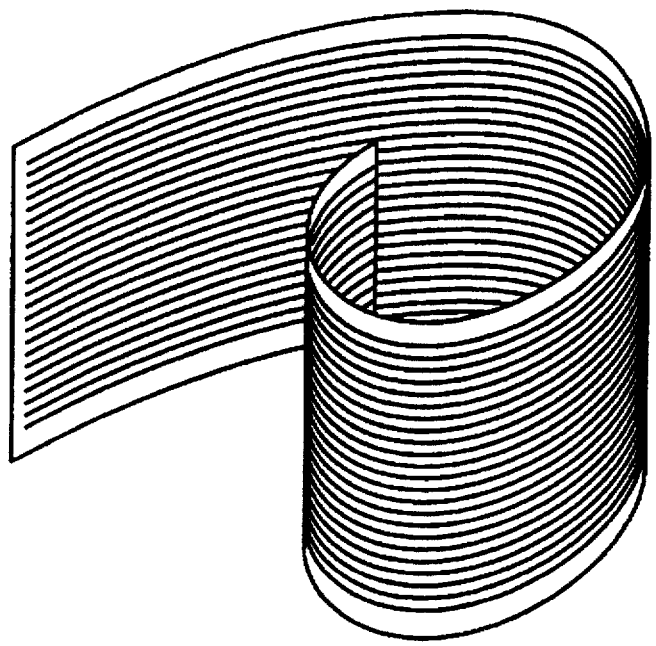
FIG. 2 is a schematic illustration of another embodiment of the electrode according to the present invention, in which an electroconducting foil is applied to a carbon fiber sheet.
Figure 3:
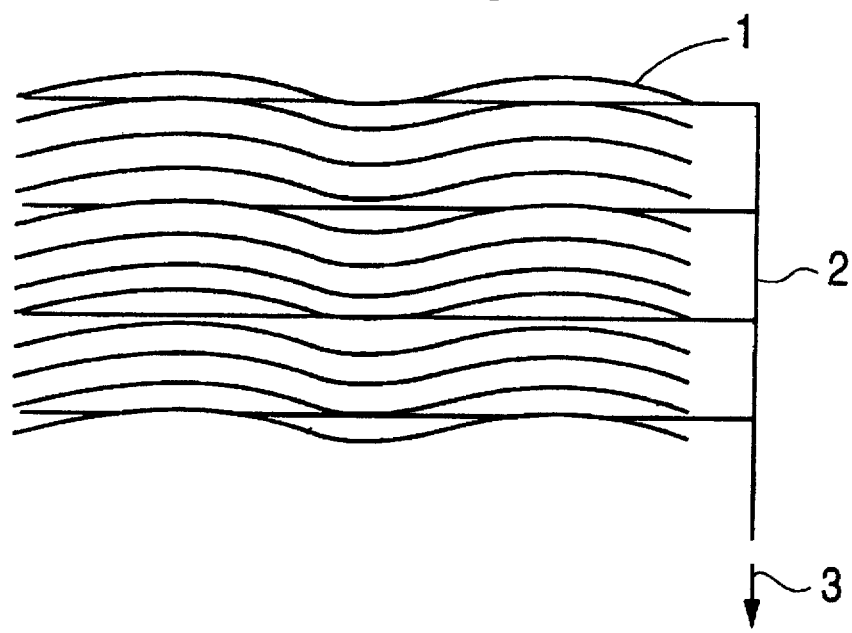
FIG. 3 is a schematic illustration of another embodiment of the electrode according to the present invention, in which electroconducting wires are arranged in carbon fibers in the parallel direction to the fibers.
Figure 4:
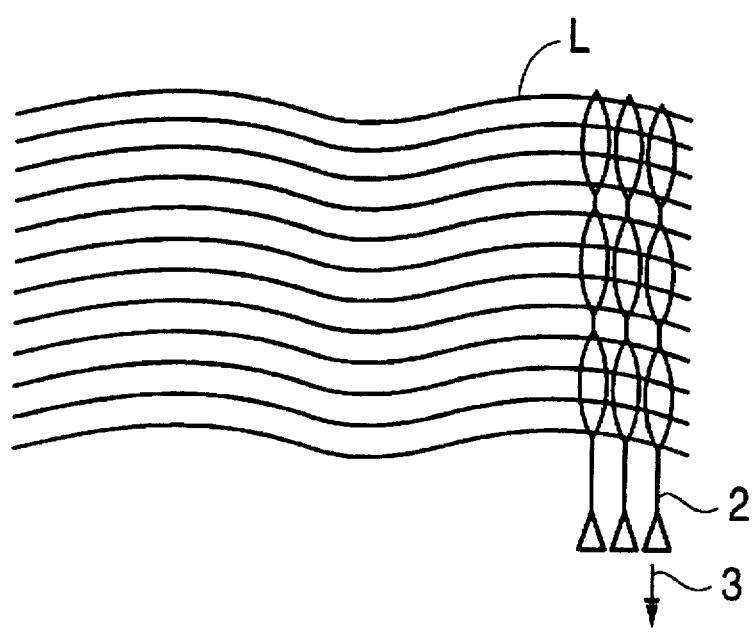
FIG. 4 is a schematic illustration of another embodiment of the electrode according to the present invention, in which the carbon fibers are woven in networks of electroconducting wires.

FIG. 1 illustrates an embodiment of the electrode of the present invention, in which carbon fibers are arranged in an uni-axial direction and an electroconducting foil is applied thereto. FIG. 3 illustrates another embodiment of the electrode of the present invention, in which carbon fibers are arranged in an uni-axial direction and electroconducting wires are also arranged in the same direction as the carbon fibers. In FIG. 3, 1 stands for carbon fibers, 2 for electroconducting wires represented by metal fibers, and 3 for the direction connecting with the taking-out electrode, respectively. In the case where the carbon fibers are arranged in an uni-axial direction as shown in these drawings, by arranging the electroconducting wires in the direction vertical to the direction of the carbon fibers so that the carbon fibers are bound with the electroconducting wires, the carbon fibers come to be fixed to some extent; which is the more preferable mode for practice. In addition, as shown in FIG. 4, by weaving the carbon fibers arranged in an uni-axial direction into the networks of electroconducting wire, not only the carbon fibers can be prevented from becoming into pieces, but also the electrical collection efficiency becomes well.

In order to improve the electrical conductivity with the carbon fibers, a method in which a sheet-shaped carbon fibers arranged in an uni-axial direction are closely adhered on an electroconducting foil represented by a metal foil is preferably employed. This method can be carried out, for example, by adhering a part or all of the carbon fibers on a metal foil under compression by means of roll press and the like, or adhering the carbon fibers on a metal foil using a small amount of a resin such as Teflon and poly(vinylidene fluoride) as a binder.

In case where the electrode is rolled up, the direction of the carbon fibers to be arranged is preferably approximately vertical against the rolled direction. This is because that, this arrangement can prevent the loosening of the carbon fibers placed inside of the metal foil and can make the carbon fibers to be hardly broken when the electrode is rolled up. Furthermore, by such arrangement, there can also be prevented the penetration of the broken carbon fiber edges through a separator or the sticking of the broken carbon fiber edges out of the both ends of the electrode by moving in zigzag directions. The penetration through a separator and sticking out of the both ends of the electrode of the broken carbon fiber edges are undesirable since they may cause the electrical short circuit with the positive electrode.

As described above, the electrode in which the carbon fibers are integrated with the metal foil enables to lower the contact resistance of the carbon fibers and to make the distance between the metal collector and the carbon fibers shorter and, as the result, more uniform potential in the carbon fibers can be given. Therefore, the decrease in capacitance caused by overvoltage resulting from the contact resistance and the non-uniform doping caused by the non-uniform potential in the carbon fibers can also be prevented.

The weight of the carbon fibers to be arranged in an uni-axial direction is preferably not smaller than 30 $g/m^2$ and not larger than 200 $g/m^2$, and more preferably not smaller than 50 $g/m^2$ and not more larger than 150 $g/m^2$. When the weight is too large, the carbon fiber sheet itself becomes thick and the resistance of the thickness direction becomes high, which results in occasional non-uniform doping and difficulty in use of the resulting electrode at high output current. On the other hand, when the weight is too small, the amount ratio of the carbon fibers, i.e. active material, based on the whole amount of the resulting negative electrode becomes small, which results in decrease in the amount of the carbon fibers to be packed in a battery and reduction in energy density of the battery.

The carbon fiber to be used in the present invention is not particularly limited, but a filament prepared by firing an organic substance is generally used. Specific examples of such carbon fiber include a PAN-based carbon fiber prepared from polyacrylonitrile (PAN), a pitch-based carbon fiber prepared from pitch of coal, petroleum or the like, a cellulose-based carbon fiber prepared from cellulose and a vapor phase grown carbon fiber prepared from gas of a low molecular organic material. In addition, other carbon fibers prepared by firing poly(vinyl alcohol), lignin, poly(vinyl chloride), a polyamide, a polyimide, a phenol resin, furfuryl alcohol and so on can also be employed. The carbon fiber to be used is suitably selected from those listed above depending on the intended properties of the resulting electrode or battery.

Among the carbon fibers listed above, when used for a negative electrode of a secondary battery in which a non-aqueous electrolytic solution containing an alkali metal salt is used, preferably employed are a PAN-based carbon fiber, a pitch-based carbon fiber and a vapor phase grown carbon fiber. In particular, from the viewpoint of a good doping property with lithium ions, a PAN-based carbon fiber is most preferable.

In the present invention, the carbon fibers obtained by firing may be subjected to any subsequent treatment and any type of carbon fiber may be employed, so long as it retains a form of carbon fiber. In particular, the carbon fiber which is subjected to the charging/discharging treatment in an electrolytic solution prior to incorporating into a battery are effectively used since it can reduce the initial capacity loss (i.e. retention) inherent to a carbonaceous material. The initial capacity loss results from the phenomenon that a part of dopants (e.g. lithium ion) which are doped during the initial charging step remains in the carbonaceous material and the residue is not dedoped in the subsequent discharging step. In order to improve the capacity of a secondary battery, it is effective to reduce the initial capacity loss. The carbon fiber itself has an electrical conductivity and is a continuous material, and therefore suitable for the previous charging/discharging treatment. Specific example of such previous treatment method is that in which the carbon fiber is doped or dedoped in an electrolytic solution containing lithium ions.

In the second invention of the present application, the form or shape of the carbon fiber sheet is not particularly limited, but is preferably a sheet-shaped structural in which the carbon fibers are arranged in an uni-axial direction. In the cloth-type or felt-type carbon fiber sheet, any form may be employed such as woven fabric, knit fabric, plaited fabric, lace, mesh, felt, paper, non-woven fabric and mat.

The diameter of the carbon fiber to be used in the present invention should be determined so that the carbon fibers can be prepared in the form as described above, and preferably 1 to 500 μm, more preferably 3 to 10 μm. It is also preferable to use several kinds of carbon fibers having different diameters individually.

As the metal to be used as an electrically conductive foil and wire, there can be employed gold, silver, copper, platinum, rhodium, aluminum, iron, nickel, chromium, manganese, lead, zinc, tungsten, titanium, and so on. In addition, alloys of the metals listed above can also be employed, such as stainless steel. These metals may be coated of their surfaces with various substances so long as they are impaired of their electrical conductivity. The metal or coated one thereof is made into a foil or a wire, and then arranged with the carbon fibers in the forms shown in the drawings. In case of metal foil, a thin foil is preferably used, since the thick metal foil causes to decrease in the amount of the active material to be stored in a battery. The thickness of the metal foil is preferably about 5 to 100 μm. In particular, from the viewpoints of electric resistance and thickness and cost of the metal foil to be used, copper foil is preferably employed. On the other hand, in case of metal wire, the diameter should be determined depending on properties, diameter and shape of the carbon fiber used, so that the current collecting effect is enhanced or the carbon fibers are bundled easily, but is preferably about 1 to 200 μm, more preferably 5 to 100 μm. In order to increase the intensity of bundling of carbon fibers, it is preferable to bundle several fine metal wires in a twisted form.

The ratio between the carbon fibers and the electroconducting wires in an electrode of the present invention should be determined suitably taking into consideration of the properties and current collecting efficiency of the resulting electrode and so on. However, the ratio of the electroconducting wires to the carbon fibers of the resulting electrode is preferably 1 to 10% by weight and 0.2 to 2% by volume, and more preferably 2 to 8% by weight and 0.4 to 2% by volume.

In the fibrous and cloth-shaped carbon fibers, the partial breaking of the single fiber in the carbon fiber bundle, i.e. fuzzing, tends to occur. The fluffs sometimes penetrate through a separator to contact with a positive electrode, which causes the internal short circuit. In order to prevent this defect, it is effectively carried out to paste and coat a part or all of carbon fibers with a resin. The resin to be used is not particularly limited, and a conventional thermoplastic or thermosetting resin can be employed. In particular, preferably used are a fluororesin, an olefin resin, an epoxy resin, an urethane resin, an acryl resin and a polyester resin singly or in combination thereof, and a modified one thereof.

The method for pasting and coating carbon fibers with a resin is not particularly limited. However, it is preferable to paste and coat carbon fibers by passing the carbon fibers through a polymer solution or emulsion vessel, or by spraying the solution or emulsion thereon. When the amount of the polymer to be coated on the carbon fibers is too small, the fuzzing of the carbon fibers can not be depressed sufficiently. On the other hand, when the amount of the polymer is too large, the function of the carbon fibers themselves as active material tends to be reduced.

From these reasons, the amount of the polymer used for coating of carbon fibers is preferably not less than 0.1 part by weight and not more than 15 parts by weight based on 100 parts by weight of the carbon fibers. When the amount is less than 0.1 part by weight, the fuzzing can not be prevented sufficiently. On the other hand, when the amount is over 15 parts by weight, the electrical properties of the carbon fibers as negative electrode active material is affected. In particular, when the discharging current becomes over 500 mA per 1 g of the negative electrode active material, the initial discharge capacity tends to be resuced to 70% of that given when the carbon fibers are uncoated.

From these reasons, the coating amount of a polymer is most preferably 0.5 to 10 parts by weight, and particularly 0.5 to 8 parts by weight. In the method for coating a polymer on carbon fibers, in the case where the polymer is solved in an water soluble organic solvent such as N-methylpyrrolidone, it is more effective to precipitate the polymer by wet solidification in water or a mixed solution of an organic solvent and water.

The separator to be used in the present invention is not particularly limited, and a commercially available product can also be employed, so long as it is a porous film, a woven fabric, a non-woven fabric and so on having insulating property, such as that made of polyolefin, polypropylene, polytetrafluoroethylene, polyethylene and polyacetal. The film thickness of the separator is preferably not larger than 200 μm, and more preferably not larger than 50 μm, for the purpose of reducing the internal resistance of the resulting battery. More specifically, "Cellguard" (a trade name produced by Daicel kabushiki Kaisha) and "Highpore" (a trade name produced by Asahi Kasei Kogyo Kabushiki Kaisha) are preferably used.

As the material used for a positive electrode as a constituent of a secondary battery, a carbon fiber can be used. In addition, there can also be used artificial or natural graphite, carbon fluoride, an inorganic compound such as a metal and a metal oxide, and an organic high molecular compound. When an inorganic compound such as a metal and a metal oxide is used for a positive electrode, the charging/discharging reaction occurs utilizing the phenomenon of doping and dedoping of cations. On the other hand, when an organic high molecular compound is used for a positive electrode, the charging/discharging reaction occurs utilizing the phenomenon of doping and dedoping of anions. Thus, the charging/discharging reaction takes various manners according to the kinds of the substances employed, and is suitable selected according to the intended properties of the positive electrode of the resulting battery.

Specific examples of the positive electrode material include inorganic compounds such as oxides and chalcogenides of transition metals involving alkali metals; conjugated polymers such as polyacetylene, poly(paraphenylene), poly(phenylene vinylene), polyaniline, polypyrrole and polythiophene; bridged polymers having disulfide bond(s); thionyl chloride; and so on; which are compounds used in conventional secondary batteries. Among these, in case of a secondary battery using a nonaqueous electrolytic solution containing lithium ions, an oxides or chalcogenide of a transition metal such as cobalt, manganese, molybdenum, vanadium, chromium, iron, copper or titanium is preferably used. In particular, compounds $LiCoO_2$ and $LiNiO_2$ are most preferable since they exhibit high voltage and large energy density.

The electrolytic solution to be used for the secondary battery in which the electrode of the present invention is used is not particularly limited, and a conventional one is employed such as an acidic or alkaline aqueous solution or non-aqueous solvent. In particular, as an electrolytic solution for a secondary battery using a non-aqueous electrolytic solution containing an alkali metal salt listed above, there are preferably used propylene carbonate, ethylene carbonate, τ-butyrolactone, N-methylpyrrolidone, acetonitrile, N,N-dimethylformamide, dimethylsulfoxide, tetrahydrofuran, 1,3-dioxolane, methyl formate, sulfolane, oxazoline, thinyl chloride, 1,2-dimethoxyethane, diethylene carbonate, derivatives thereof and mixtures of two or more of them. As the electrolyte to be contained in the electrolytic solution, are preferably employed halides of alkali metals, especially of lithium, perchlorates, thicyanates, borofluorides, phosphofluorides, arsenofluorides, aluminofluorides, trifluoromethylsulfates, and so on.

For the application to a secondary battery which uses a non-aqueous electrolytic solution containing an alkali metal salt, the electrode comprising carbon fibers of the present invention utilizes a phenomenon of doping of cations or anions to carbon fibers. Therefore, this electrode can be used for both of negative and positive electrodes, and preferably for a negative electrode of a secondary battery. In particular, when cations represented by lithium ions are doped, the carbon fibers show excellent properties as a negative electrode material for high energy-type battery which exhibits high capacity and base potential. In addition, since the carbon fibers are used in a fibrous form, they can make their contact resistance lower compared with carbon powder, and as the result high current discharge becomes possible.

The secondary battery using the electrode of the present invention can be applied to various portable small electronic devices such as video cameras, personal computers, word processors, radios with cassette, portable telephones and so on, due to its characteristics of lightweight, high capacitance and high energy density.

EXAMPLES

The present invention will be illustrated in more detail with reference to the following examples; however, these examples are intended to be understood not to limit the scope of the present invention.

Example 1

A tow-shaped structural body containing 12000 carbon fibers was made by bundling "TORAYCA T300" (a trade name produced by Toray Industries, Inc.) carbon fiber, which was fixed at its ends with an electroconductive copper paste. Five of the resulting tow-shaped structural bodies are arranged unidirectionally, and then adhered of their ends with copper foils, to give a sheet of 20 mm in length, 50 mm in width and about 0.3 mm in thickness. The weight of the resulting carbon fiber sheet was 230 mg.

For the determination of the capacitance of the uni-directionally arranged body of the carbon fibers for a secondary battery, a triode-type cell was prepared using lithium foils as a counter electrode and a reference electrode and using a solution in which 1M of lithium perchlorate had been dissolved in propylene carbonate as an electrolytic solution. The resulting cell was charged until the voltage reached to 0 V at a constant current of 20 mA, and after resting for 20 minutes, was discharged until the voltage reached to 1.5 V at a constant current of 20 mA to determine the discharge capacity. As the result, the capacitance of the cell per weight was 304 mAh/g, and it was proved that this method could give a high discharge capacity.

Example 2

(1) Preparation of electrode

On a copper foil of 15 μm in thick, commercially available PAN-based carbon fibers "TORAYCA T-300" (a trade name produced by Toray Industries, Inc.) were placed in an uni-axial direction uniformly, to give an electrode comprising a copper foil and carbon fibers, in which the weight of the carbon fibers was 100 g/m².

(2) Preparation of positive electrode

Commercially available lithium carbonate ($Li_2CO_3$) and basic cobalt carbonate ($2CoCO_3 \cdot Co(OH)_2$) were weighed so that the molar ratio of these components became Li/Co=1/1, and then mixed with each other using a ball mill. The resulting mixture was treated by heating at 900° C. for 20 hours, to give $LiCoO_2$. The resulting $LiCoO_2$ was crushed using a ball mill. A slurry for a positive electrode was prepared by mixing the $LiCoO_2$, artificial graphite as an electroconducting material, poly(vinylidene fluoride) (PVDF) as a binder and N-methylpyrrolidone as a solvent in a mixing ratio of $LiCoO_2$/artificial graphite/PVDF=80/15/5 by weight. The resulting slurry was applied on an aluminum foil, dried and pressed; whereby a positive electrode was given.

(3) Preparation of battery

Two kinds of electrodes prepared in steps (1) and (2) above, respectively, were superposed upon each other with interposing a separator of a porous polypropylene film, ("Cellguard #2500"; a trade name by Daicel Kagaku Kabushiki Kaisha) therebetween, and then rolled up, to give a cylindrical electrode body. The resulting electrode body was immersed into a beaker cell in which an electrolytic solution of propylene carbonate containing 1M of lithium perchlorate was put. Terminals were taken out from the copper foil and the aluminum foil, respectively; thus a secondary battery was prepared.

(4) Evaluation of battery

The secondary battery thus prepared was evaluated for its charging property. That is, the secondary battery was charged until the voltage reached to 4.3 V at a constant current of 40 mA/g as the current density per weight of the carbon fibers, and was discharged. The discharge capacity of the secondary battery, which was determined from the charge amount given by the discharging, was 320 mAh/g per weight of the carbon fibers used in this battery.

Example 3

As the carbon fibers, commercially available PAN-based carbon fibers ("TORAYCA T-300"; a trade name produced by Toray Industries, Inc.; 3K; 3000 fibers) were used. As the polymer for pasting and coating of the carbon fibers, a commercially available poly(vinylidene fluoride) resin ("Neoflon VP-850"; a trade name produced by Daikin Kagaku Kabushiki Kaisha) was used by dissolving in N-methyl-2-pyrrolidone.

The carbon fibers were immersed in the PVDF solution, and then further immersed in a solution having a composition of water: N-methyl-2-pyrrolidone=1:1 (by weight) to solidify the polymer. The resultant was dried at 150° C. for 1 hour, to give carbon fibers pasted with the polymer. The PVDF polymer-adhered carbon fibers thus prepared had an adhesion amount of the polymer of 5% by weight based on the weight of the carbon fibers and an average pore diameter measured using a SEM photograph of about 15 μm.

In order to examine the influence of fluffs of the carbon fibers pasted and coated with the polymer against a separator, the carbon fibers is inserted into polypropylene porous film ("Cellguard"; a trade name produced by Daicel Kagaku Kabushiki Kaisha) to be fixed and then wound up around a stainless steel rod. The resultant was applied with a line pressure of 2 kg/cm for 10 minutes to observe whether the carbon fibers penetrated through a separator or not. As the result, no penetration of carbon fibers was observed.

According to the same method as Example 2, a triode-type beaker cell was prepared using these carbon fibers woven into networks of nickel fine wires as a working electrode, metal lithium as a counter electrode and a reference electrode, and 1M-LiClO$_4$/propylene carbonate as an electrolytic solution. The resulting cell was charged (i.e. doped with lithium ions) until the voltage reached to 0 V (vs Li$^+$/Li) for the reference electrode at a constant current of 100 mM/g based on the weight of the carbon fibers, and after resting for 20 minutes, discharged (i.e. dedoped) under the same condition until the voltage reached to 1.5 V (vs Li$^+$/Li); thus the cell was charged and discharged to determine the discharge capacity.

As the result, the discharge capacity was 350 mAh/g, which was the same vale as that given when the carbon fibers were not pasted or coated with PVDF polymer. Accordingly, the reduction in discharge capacity caused by the pasting and coating with a polymer was not recognized.

On the other hand, when the carbon fibers were used as they were without pasting or coating with a polymer, the discharge capacity given was 351 mAh/g. However, when the penetration of the carbon fibers through a separator was examined, 10 to 15 of penetrating ponts by the carbon fibers were observed on the separator.

Example 4

(1) Preparation of electrode 20 mg of commercially available PAN-based carbon fibers "TORAYCA T-300" (a trade name produced by Toray Industries, Inc.) were arranged in an uni-axial direction, and woven their ends with nickel fine wires (diameter: 100 μm) in the direction vertical to the arranged direction of the carbon fibers, and bundled as shown in FIG. 3; thus an electrode was prepared. In the resulting electrode, the weight ratio between the carbon fibers and the metal fine wires was 100:1.

(2) Evaluation of charging property

The evaluation of charging property was carried out using the electrode prepared above. In this evaluation, a triode-type liquid cell was used in which propylene carbonate containing 1M lithium perchlorate was used as an electrolytic solution and metal lithium foils were used as a counter electrode and a reference electrode, respectively, and the liquid cell was charged until the voltage reached to 0 V (vs Li$^+$/Li) at a constant current of 40 mA/g as the current density per weight of the carbon fibers. As the result, the return of the voltage, i.e. overvoltage, given after resting for 20 minutes was 10 mV.

Example 5

(1) Preparation of electrode 20 mg of commercially available PAN-based carbon fibers "TORAYCA T-300" (a trade name produced by Toray Industries, Inc.) were arranged in an uni-axial direction, and woven their ends with nickel fine wires (diameter: 100 μm) in a network form as shown in FIG. 4; thus an electrode was prepared. In the resulting electrode, the weight ratio between the carbon fibers and the metal fine wires was 100:1.

(2) Evaluation of charging property

The evaluation of charging property was carried out using the electrode prepared above in the same manner as Example 1. As the result, the overvoltage given after charging was 0.5 mV.

Example 6

A coin-shaped secondary battery was prepared using the carbon fibers of Example 3, which had been pasted and coated with a PVDF polymer, as a negative electrode, the LiCoO$_2$/artificial graphite/PVDF of Example 2 as a positive electrode; in a manner that the positive electrode and the negative electrode were superposed upon each other with interposing a separator. In this secondary battery, 1M-LiClO$_4$/propylene carbonate was used as an electrolytic solution.

The charging/discharging test was carried out using 100 pieces of the coin-shaped secondary batteries prepared above. As the result, no defective such as short circuit was not observed, and all of the secondary batteries tested were operated normally.

Example 7

(1) Preparation of carbon fiber electrode and charging/discharging thereof

A beaker cell was prepared using commercially available PAN-based carbon fibers "TORAYCA M40" (a trade name produced by Toray Industries, Inc.) bundled with Ni wire of a current collector as a working electrode, and using metal lithium as a counter electrode and a reference electrode, and using 1M-LiClO$_4$/propylene carbonate as an electrolytic solution.

In the resulting cell, lithium ions were doped until the voltage reached to 0 V (vs. Li$^+$/Li) to the reference electrode and then dedoped under the same condition until the voltage reached to 1.5 V (vs. Li$^+$/Li); thus the charging and discharging of the cell was completed.

(2) Preparation of secondary battery and evaluation thereof

The carbon fibers which had been charged and discharged previously in the step (1) above were arranged on a Ni mesh. The resultant was superposed upon the positive electrode prepared in the same manner as Example 4 with interposing a separator; thus a coin-shaped cell was prepared. In this cell, propylene carbonate containing 1M lithium perchlorate was used as an electrolytic solution. When this cell was charged and discharged, the Coulomb s efficiency given was 96%. In this cell, by the previous charging and discharging, the initial volume loss was, reduced from the value of 30 mAh/g given when no treatment was carried out to the value 5 mAh/g.

Industrial Applicability

As described above, the electrode of the present invention comprises an uni-directionally arranged body of carbon fibers or one comprising the carbon fibers and electrically conductive foil or wires. By using the electrode for a chargeable/dischargeable secondary battery in which a carbonaceous material capable of doping and dedoping of lithium ions is used as a negative electrode active material, there can be provided a secondary battery having high capacitance and high outputting property.

We claim:

1. An electrode which comprises a sheet of uni-directionally arranged carbon fibers extending be essentially in a single direction, which sheet is placed on a metal foil, wherein the electrode is rolled up so that the arranged direction of the carbon fibers is approximately perpendicular to the rolling direction of the electrode.

2. The electrode according to claim 1, wherein the metal foil is a copper foil.

3. The electrode according to claim 1, wherein electro-conducting wires are further arranged in the carbon fibers in a direction parallel to the axial direction of the fibers or in a direction perpendicular to the axial direction of the fibers.

4. The electrode according to claim 1, wherein the carbon fibers are pasted and coated with a resin.

5. The electrode according to claim 4, wherein the resin is a thermoplastic resin.

6. The electrode according to claim 4, wherein the resin is a thermosetting resin.

7. The electrode according to claim 4, wherein the amount of the resin used is not smaller than 3% by weight and not larger than 17% by weight based on the amount of the carbon fibers.

8. The electrode according to claim 4, wherein the amount of the resin used is not smaller than 5% by weight and not larger than 10% by weight based on the amount of the carbon fibers.

9. The electrode according to claim 4, wherein the resin is poly(vinylidene fluoride).

10. The electrode according to claim 1, wherein the carbon fibers which have been previously charged and discharged are used as active material.

11. The electrode according to claim 1, which is used as a negative electrode.

12. A secondary battery which uses the electrode according to claim 1.

13. The secondary battery according to claim 12 which uses a non-aqueous electrolytic solution containing lithium salt and a positive electrode capable of taking in and out of lithium.

14. The secondary battery according to claim 12, wherein a transition metal oxide is used for a positive electrode.

15. The secondary battery according to claim 12, wherein the transition metal oxide is $LiCoO_2$ or $LiNiO_2$.

16. An electrode which comprises a sheet of uni-directionally arranged carbon fibers extending essentially in a single direction, which sheet is placed on a metal foil, wherein the electrode is rolled up so that the arranged direction of the carbon fibers is approximately parallel to the rolled direction of the electrode.

* * * * *